United States Patent
Karaba et al.

(10) Patent No.: US 7,483,775 B2
(45) Date of Patent: Jan. 27, 2009

(54) METHOD AND APPARATUS FOR CONTROLLING SEMI-ACTIVE SUSPENSION COMPONENTS

(75) Inventors: Matthew M. Karaba, Oxford, MI (US); Youssef A. Ghoneim, Torslanda (SE); Robert R. Bolio, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 427 days.

(21) Appl. No.: 11/231,328

(22) Filed: Sep. 20, 2005

(65) Prior Publication Data

US 2006/0074533 A1 Apr. 6, 2006

Related U.S. Application Data

(60) Provisional application No. 60/611,553, filed on Sep. 20, 2004.

(51) Int. Cl.
*B60G 17/016* (2006.01)
*B60G 17/018* (2006.01)
(52) U.S. Cl. .................... 701/37; 280/5.507; 280/5.503

(58) Field of Classification Search ................ None
See application file for complete search history.

(56) References Cited

U.S. PATENT DOCUMENTS

| 5,346,242 | A | * | 9/1994 | Karnopp ................... 280/5.514 |
| 5,720,533 | A | | 2/1998 | Pastor et al. |
| 5,746,486 | A | | 5/1998 | Paul et al. |
| 5,941,919 | A | | 8/1999 | Pastor et al. |
| 6,056,371 | A | | 5/2000 | Lin et al. |
| 6,640,171 | B2 | * | 10/2003 | Chen et al. ..................... 701/41 |
| 6,953,108 | B2 | * | 10/2005 | Anderfaas et al. ........ 188/267.2 |
| 7,321,816 | B2 | * | 1/2008 | Lauwerys et al. ............. 701/37 |
| 2002/0128760 | A1 | * | 9/2002 | Bodie et al. .................... 701/37 |
| 2002/0183907 | A1 | * | 12/2002 | Stiller .......................... 701/37 |

FOREIGN PATENT DOCUMENTS

JP       07-032837  A  *  2/1995

* cited by examiner

*Primary Examiner*—Michael J. Zanelli

(57) ABSTRACT

A vehicle comprises a semi-active suspension including controllably adjustable suspension dampers. Open loop and closed loop damper commands are determined for each damper and, depending upon turning direction and damper motion, each damper is controlled with one of the open loop and closed loop damper commands.

11 Claims, 4 Drawing Sheets

| | 0 | 8 | 40 | 80 | 100 | 200 |
|---|---|---|---|---|---|---|
| 0.1 | 0.1 | 0.2 | 0.3 | 0.4 | 0.4 | 0.4 |
| 0.5 | 0.2 | 0.3 | 0.5 | 0.6 | 0.6 | 0.6 |
| 1.0 | 0.4 | 0.5 | 0.7 | 1.0 | 1.0 | 1.0 |

Vehicle Speed / |Lateral Acceleration|

| | | Damping Motion/Corner | | | | | | | |
|---|---|---|---|---|---|---|---|---|---|
| | | Critical | | | | Non-critical | | | |
| | | LF | RF | LR | RR | LF | RF | LR | RR |
| Turn Direction | Right | Jounce | Rebound | Jounce | Rebound | Rebound | Jounce | Rebound | Jounce |
| | Left | Rebound | Jounce | Rebound | Jounce | Jounce | Rebound | Jounce | Rebound |

*Fig. 5*

METHOD AND APPARATUS FOR CONTROLLING SEMI-ACTIVE SUSPENSION COMPONENTS

CROSS REFERENCE TO RELATED APPLICATION

This application claims the benefit of U.S. Provisional No. 60/611,553 filed Sep. 20, 2004, and which is hereby incorporated by reference in its entirety.

TECHNICAL FIELD

The present invention is generally related to vehicle stability control. More particularly, the invention relates to the control of damping components as part of a vehicle stability control.

BACKGROUND OF THE INVENTION

Steering stability and performance of a vehicle are largely characterized by the vehicle's understeer and oversteer behavior. The vehicle is in an understeer condition if the vehicle yaw is less than the operator steering input, where turning the steering wheel more does not correct the understeer condition because the wheels are saturated. The vehicle is in an oversteer condition if the vehicle yaw is greater than the operator steering input. Surfaces such as wet or uneven pavement, ice, snow or gravel also present vehicle stability and handling challenges to the driver. Similarly, in a panic or emergency situation, such as during obstacle avoidance, a driver may react by applying too much steering or failing to counter-steer to bring the vehicle back to its intended path. In any of these cases, the actual vehicle steering path deviates from the intended steering path.

Modern vehicles sometimes incorporate active vehicle control sub-systems that enhance operator comfort and safety, including sub-systems which address such deviations in the vehicle path. One such subsystem is known as a vehicle stability enhancement (VSE) system that assists the vehicle operator in providing vehicle handling. The VSE system helps the vehicle operator maintain control during rapid or emergency steering and braking maneuvers and can correct for understeer and oversteer conditions. The VSE system senses wheel speed, steering angle, vehicle speed and yaw rate. The VSE system uses these inputs to reduce engine torque and apply vehicle braking to maintain the vehicle travel along the intended path.

Another active vehicle control sub-system is known as an active front steering (AFS) system for providing automatic front-wheel steering. AFS systems employ a steering actuator system that receives an operator intended steering signal from a hand wheel sensor, a vehicle speed signal and a vehicle yaw rate signal, and provides a correction to the operator steering signal to cause the vehicle to more closely follow the vehicle operator's intended steering path to increase vehicle stability and handling. The AFS system is able to provide steering corrections much quicker than the vehicle operator's reaction time, so that the amount of operator steering is reduced. In such applications, the AFS system includes yaw rate measurements and feedback control to generate an additional steering input to the front wheels.

Semi-active suspension systems are also incorporated into some modern vehicles and are generally characterized by dampers which are controlled to change the suspension characteristics of the vehicle based on road conditions, vehicle speed, yaw and other considerations. Variable fluid-based dampers are known having discrete damping states and continuously variable damping states. Variability in damping may be attained by variable orifice devices or controlled viscosity fluids (e.g. magnetorheological (MR) or electrorheological (ER)) within the damping device. Variable dampers are used predominantly to achieve low speed ride comfort and high speed handling enhancement. However, variable damping techniques are known to enhance vehicle stability in certain understeer and oversteer situations.

The VSE, AFS and suspension control systems are generally effective at maintaining vehicle stability in light of slowly varying or static road conditions. However, severe and rapidly transient road conditions (e.g. pot holes) effect inputs which may significantly disrupt stability controls when active.

Therefore, it is desirable to account for transient road conditions in vehicle stability systems and minimize the undesirable effects thereof on such systems and controls so that the systems can provide the intended vehicle path across a variety of slowly and rapidly changing road conditions.

SUMMARY OF THE INVENTION

The present invention actively controls vehicle suspension damping as part of a vehicle stability control. A vehicle has a semi-active suspension including a plurality of controllable suspension dampers. In accordance with one aspect of the present invention, a method for vehicle stability suspension control includes determining turning direction for the vehicle and damper motion direction for each of the plurality of controllable suspension dampers. Open loop damping commands are determined for the plurality of controllable suspension dampers. Closed loop damping commands are also determined for the plurality of controllable suspension dampers. Control of each of the plurality of controllable suspension dampers is carried out in accordance with respective ones of the open loop and closed loop damping commands as a function of turning direction and respective damper motion direction. The closed loop damping commands are preferably implemented in conjunction with vehicle oversteer and understeer events. The open loop and closed loop damping commands are determined based on respective pluralities of vehicle dynamics metrics including vehicle speed, vehicle lateral acceleration and steering wheel angle.

In accordance with another aspect of the present invention, a method for vehicle stability suspension control includes providing vehicle stability control critical and non-critical combinations of vehicle corner dampers, damper motion directions, and vehicle turning directions. A feedback damper control signal is provided to the vehicle stability control critical combinations and a feedforward damper control signal is provided to the vehicle stability control non-critical combinations. The feedback and feedforward damper control signals are determined based on respective pluralities of vehicle dynamics metrics including vehicle speed, vehicle lateral acceleration and steering wheel angle.

In accordance with another aspect of the present invention, a control apparatus for the vehicle suspension system includes a feedback controller effective to provide a suspension damper feedback command, wherein the feedback controller includes a respective plurality of vehicle dynamics metrics. The control apparatus for the vehicle suspension system further includes a feedforward controller effective to provide a suspension damper feedforward command, wherein the feedforward controller includes a respective plurality of vehicle dynamics metrics. And, the control apparatus for the vehicle suspension system also includes a suspension damper command arbitrator effective to determine which of the feedback command and the feedforward command is used to control each of the controllable suspension dampers, wherein the suspension command arbitrator includes a respective plurality of vehicle dynamics metrics. The feedback controller preferably includes vehicle yaw rate error and vehicle lateral velocity error. And, the respective pluralities of vehicle dynamics metrics of the feedback controller and the feedforward controller include vehicle speed, vehicle lateral acceleration and steering wheel angle.

In accordance with another aspect of the present invention, a method for suspension control includes determining vehicle turning direction and a respective damper motion direction for each vehicle corner damper. During a vehicle stability enhancement suspension control, for example vehicle oversteer or understeer events, vehicle corner dampers corresponding to predetermined control critical combinations of vehicle turning direction and respective corner damper motion direction are closed loop controlled whereas vehicle corner dampers corresponding to predetermined control non-critical combinations of vehicle turning direction and respective corner damper motion direction are open loop controlled.

These and other advantages and features of the invention will become apparent from the following description, claims and figures.

BRIEF DESCRIPTION OF THE DRAWINGS

FIG. 5 is a table illustrating critical and non-critical corner damper and motion combinations for use by the damper command arbitration block of FIG. 2 in accordance with the present invention.

DESCRIPTION OF THE PREFERRED EMBODIMENT

Figure 1:
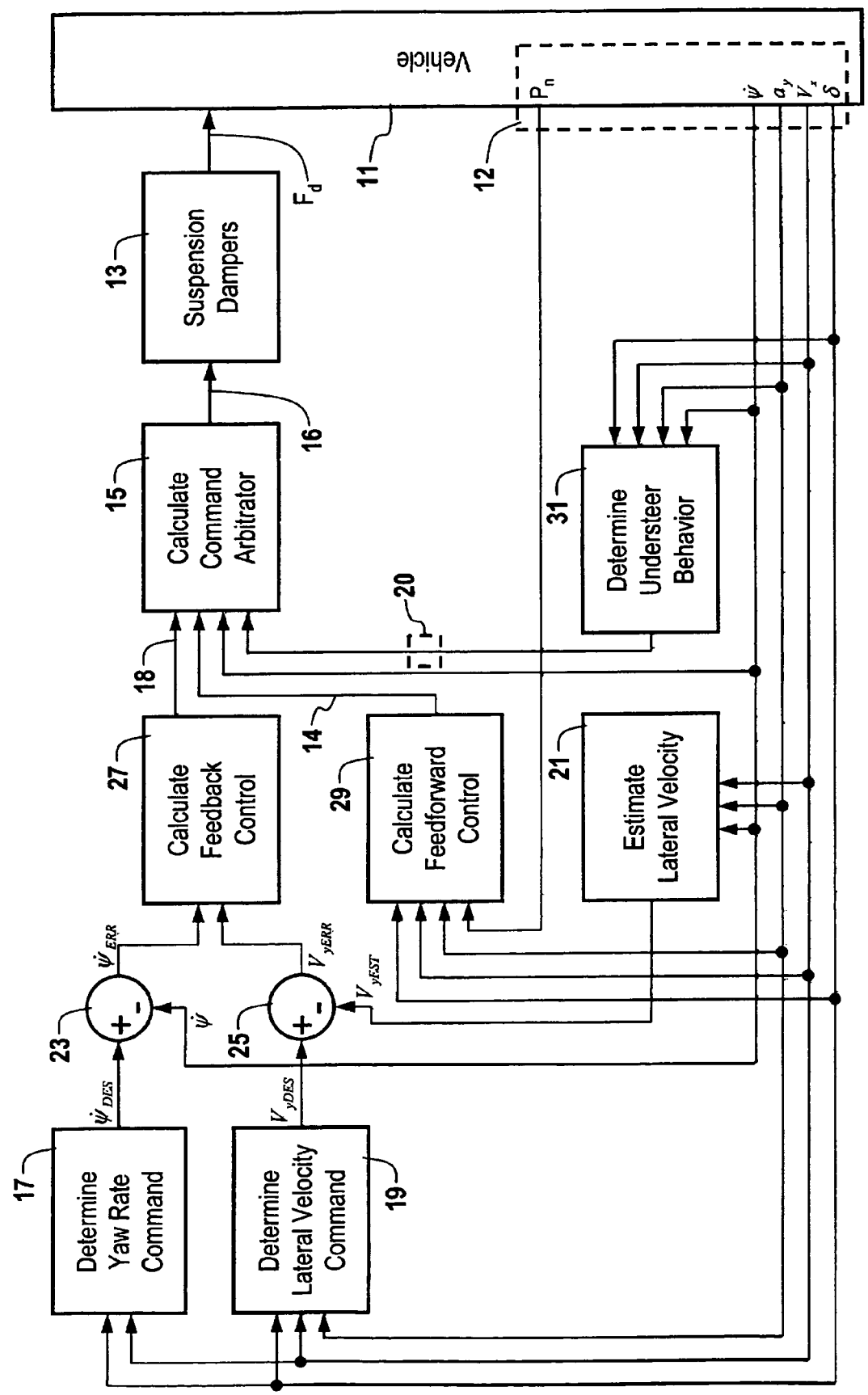
FIG. 1 is a block schematic diagram illustrating a controlled vehicular damping system in accordance with the present invention.

With reference first to FIG. 1, a schematic block diagram of a vehicle 11 suspension damper control system in accordance with the present invention is illustrated. The vehicle 11 provides a plurality of vehicle dynamics metrics 12 from sensors or derivations, including vehicle yaw rate ($\dot{\psi}$), vehicle lateral acceleration ($\alpha_y$), vehicle speed ($V_x$), steering wheel angle ($\delta$) and individual damper positions ($P_n$). The system includes a plurality of suspension dampers 13 individually associated with the respective suspension corners of the vehicle 11. Each damper effects a damping force ($F_d$) upon vehicle 11 in accordance with damper commands 16, for example control currents for effecting a desired damping response in a MR based damper. The system further includes damper command arbitration block 15 for determining damping forces for application to the plurality of dampers based on a closed loop suspension feedback command 18, a suspension feedforward command 14, and exemplary vehicle dynamics metrics including vehicle understeer/oversteer conditions 20 and vehicle yaw rate ($\dot{\psi}$) as further described herein below.

Closed loop suspension feedback command 18 is determined in accordance with an exemplary feedback control as follows. Vehicle speed ($V_x$) and steering wheel angle ($\delta$) are provided to yaw rate command block 17. A desired yaw rate command ($\dot{\psi}_{DES}$) is calculated by yaw rate command block 17, for example as disclosed in U.S. Pat. Nos. 5,720,533, 5,746,486 and 5,941,919, all of which are assigned to the assignee of the present invention and are hereby incorporated herein by reference.

Vehicle speed ($V_x$), steering wheel angle ($\delta$) and lateral acceleration ($\alpha_y$) are provided to lateral velocity command block 19. A desired lateral velocity command ($V_{yDES}$) is calculated by lateral velocity command block 19, for example as disclosed in U.S. Pat. No. 6,035,251, which is assigned to the assignee of the present invention and is hereby incorporated herein by reference.

Lateral velocity estimator 21 is provided with vehicle yaw rate ($\dot{\psi}$), vehicle lateral acceleration ($\alpha_y$) and vehicle speed to estimate therefrom the vehicle lateral velocity ($V_{yEST}$). An estimate of lateral velocity can be made through integration of vehicle lateral velocity rate ($\dot{V}_y$) as represented by the following relationship among the inputs to block 21:

$$\dot{V}_y = \alpha_y - \dot{\psi} \cdot V_x \qquad (1)$$

However, due to characteristic sensor bias and degradation of an integrated signal caused thereby, it is preferred to utilize a diminishing, integrator effective to substantially eliminate the effect of the bias on the integrated output. Further details respecting such an integration technique implementation in a stability control application can be found in U.S. Pat. No. 6,056,371, which is assigned to the assignee of the present invention and is hereby incorporated herein by reference.

Desired yaw rate command ($\dot{\psi}_{DES}$), calculated by yaw rate command block 17 is compared to vehicle yaw rate ($\dot{\psi}$) at node 23 to determine vehicle yaw rate error ($\dot{\psi}_{ERR}$). Similarly, desired lateral velocity command ($V_{yDES}$) calculated by lateral velocity command block 19 is compared to vehicle lateral velocity ($V_{yEST}$) at node 25 to determine vehicle lateral velocity error ($V_{yERR}$). Both error signals, ($\dot{\psi}_{ERR}$) and ($V_{yERR}$), are provided to feedback control block 27 for use in calculating the suspension feedback command for input to the command arbitration block 15.

Figures 2, 3:
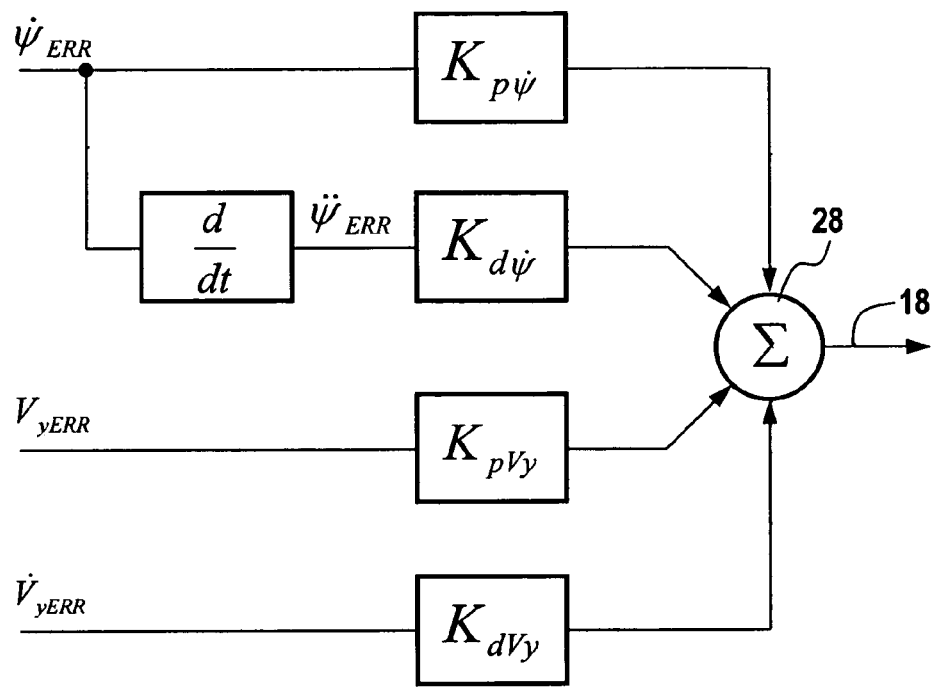
FIG. 2 is a control schematic diagram illustrating a preferred implementation of the damper feedback control of FIG. 1 in accordance with the present invention.
FIG. 3 is a table of exemplary vehicle yaw rate proportional gain calibrations for the control of FIG. 2 exemplifying the preferred relationship to vehicle speed and lateral acceleration in accordance with the present invention.

FIG. 2 illustrates an exemplary control within feedback control block 27. Therein, proportional and derivative (PD) components of the suspension feedback command from both error signals, ($\dot{\psi}_{ERR}$) and ($V_{yERR}$), are determined. Vehicle lateral velocity rate error ($\dot{V}_{yERR}$) may be determined from vehicle lateral velocity error ($V_{yERR}$) through traditional derivative processing techniques. Alternatively, the lateral velocity rate error ($\dot{V}_{yERR}$), is determined with the lateral velocity rate ($\dot{V}_y$), as calculated in lateral velocity estimator 21 and assumption that the lateral velocity rate command is null. With such assumptions, the lateral velocity rate error is substantially equivalent to the lateral velocity rate as shown in the relationship below.

$$\dot{V}_{yERR} = \dot{V}_y \qquad (2)$$

A lateral velocity derivative gain ($K_{dVy}$) is applied to the vehicle lateral velocity error derivative ($\dot{V}_{yERR}$), and the resultant component provided to summing node 28. A lateral velocity proportional gain ($K_{pVy}$) is similarly applied to the vehicle lateral velocity error ($V_{yERR}$), and the resultant component provided to summing node 28. Vehicle yaw rate error derivative ($\ddot{\psi}_{ERR}$) is determined from yaw rate error ($\dot{\psi}_{ERR}$). A yaw rate derivative gain ($K_{d\dot{\psi}}$) is applied to the vehicle yaw rate error derivative ($\ddot{\psi}_{ERR}$), and the resultant component provided to summing node 28. A yaw rate proportional gain ($K_{p\psi}$) is similarly applied to the yaw rate error ($\psi_{ERR}$), and the resultant component provided to summing node 28. The various gains in the PD control of feedback control block 27 are vehicle specific calibration values. Particularly preferred yaw rate proportional gain ($K_{p\psi}$), is characterized as functions of vehicle speed ($V_x$), and vehicle lateral acceleration ($\alpha_y$). More particularly, the general character of the yaw rate proportional gain ($K_{p\psi}$), is such that the gain increases with increasing vehicle speed and increases with increasing absolute value of vehicle lateral acceleration. This general character of a preferred yaw rate proportional gain ($K_{p\psi}$) is further illustrated in the table of FIG. 3. Similarly with respect to the yaw rate derivative gain ($K_{d\psi}$), the gain preferably is characterized as function of vehicle speed ($V_x$), and vehicle lateral acceleration ($\alpha_y$). And, more particularly, the general character of the yaw rate derivative gain ($K_{d\psi}$) is such that the gain increases with increasing vehicle speed and increases with increasing absolute value of vehicle lateral acceleration. Particularly preferred lateral velocity proportional gain ($K_{pV_y}$) is also characterized as function of vehicle speed ($V_x$), and vehicle lateral acceleration ($\alpha_y$). And, more particularly, the general character of the lateral velocity proportional gain ($K_{p\psi}$), is also such that the gain increases with increasing vehicle speed and increases with increasing absolute value of vehicle lateral acceleration. Similarly with respect to the lateral velocity derivative gain ($K_{dV_y}$), the gain preferably is also characterized as function of vehicle speed ($V_x$), and vehicle lateral acceleration ($\alpha_y$). And, more particularly, the general character of the lateral velocity derivative gain ($K_{dV_y}$) is such that the gain increases with increasing vehicle speed and increases with increasing absolute value of vehicle lateral acceleration.

Closed loop suspension feedback control as described immediately above is particularly responsive to the types of relatively rapid, transient and severe changes is road conditions that may have an undesirable destabilizing influence upon the vehicle, particularly a vehicle already under some form of vehicle stability control as described herein above.

Feedforward control block 29 is used in calculating the suspension feedforward commands 14 for input to the command arbitration block 15. Vehicle lateral acceleration ($\alpha_y$), vehicle speed ($V_x$), steering wheel angle ($\delta$) and damper positions ($P_n$) are provided to feedforward control block 29. Preferably, the feedforward control block 29 implements the well-known skyhook suspension model utilizing a fictitious inertial grounding of the damper in determining the resultant suspension feedforward command 14.

Understeer/oversteer behavior block 31 includes vehicle yaw rate ($\psi$), vehicle lateral acceleration ($\alpha_y$), vehicle speed ($V_x$) and steering wheel angle ($\delta$) inputs for use in determining resultant signals identifying current vehicle understeer/oversteer conditions. Preferably, the resultant vehicle understeer/oversteer conditions 20 are represented in the form of oversteer and understeer flags which definitively indicate whether there is significant oversteer or understeer behavior or the behavior is indeterminate or insignificant with respect to oversteer or understeer for purposes of the present control. Any suitable method for characterizing vehicle behavior as oversteer or understeer can be utilized. An exemplary preferred determination of such understeer and oversteer flags is set forth in co-pending U.S. patent application Ser. No. 10/978,982 filed Nov. 1, 2004, assigned to the assignee of the present invention, the contents of which are hereby incorporated herein by reference.

Figure 4:
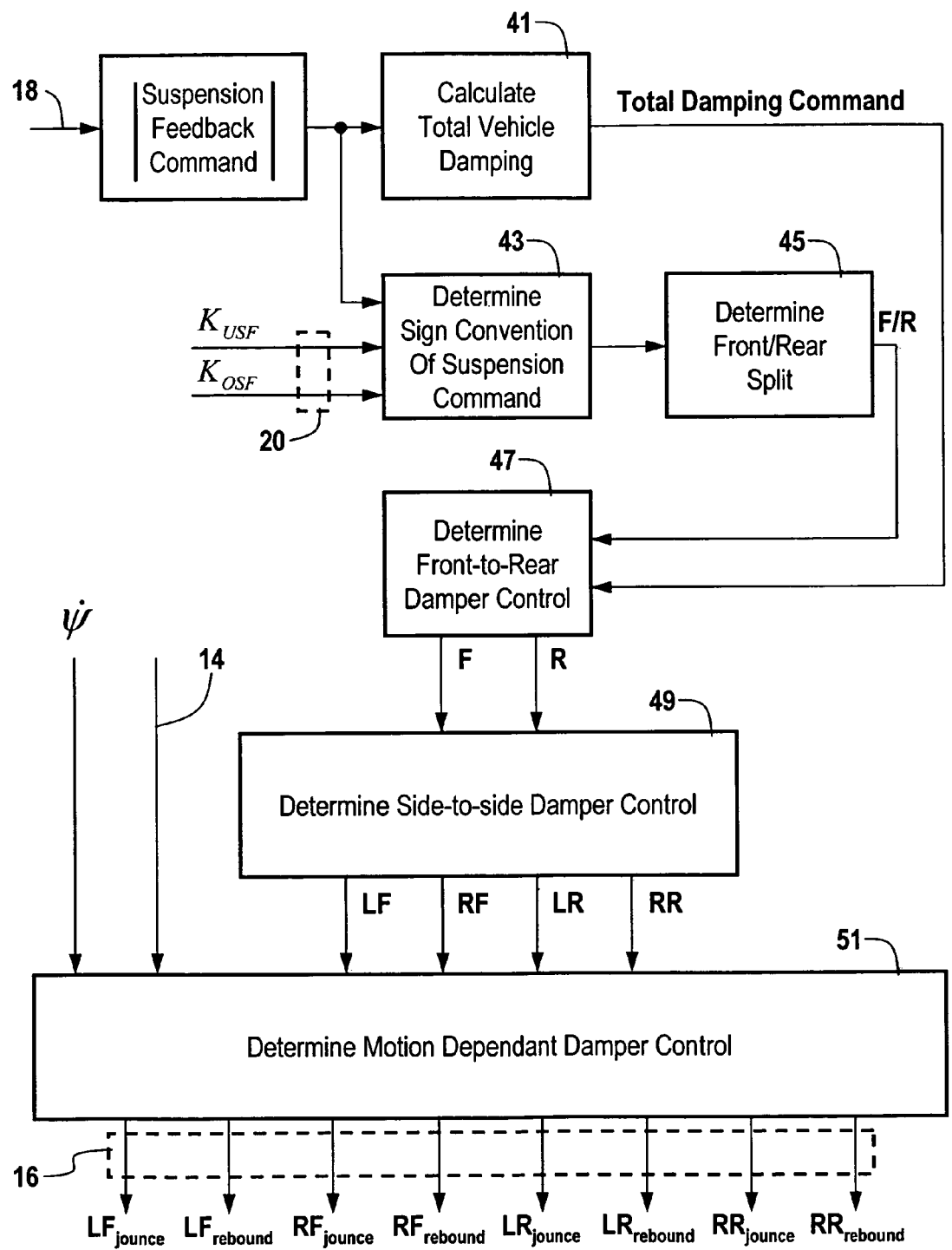
FIG. 4 is a detailed block schematic diagram illustrating a preferred implementation of the damper command arbitration block of FIG. 1 in accordance with the present invention.

With reference now to FIG. 4, the damper command arbitration block 15 is presented in further preferred detail. An unsigned (i.e. absolute value or magnitude) suspension feedback command is provided to total damping block 41 to calculate the total damping command which represents an aggregate damping force from all four vehicle corner dampers. Unsigned suspension feedback command and understeer and oversteer flags ($K_{USF}$, $K_{OSF}$) from understeer/oversteer behavior block 31 are provided to block 43 which determines a signed suspension feedback command. By convention, negatively signed commands correspond to understeer whereas positively signed commands correspond to oversteer. The signed suspension feedback command is then provided to a gain block 45 whereat the ratio of front and rear split (i.e. distribution) of total damping force is calculated (F/R split command). The total damping command from block 41 and the F/R split command from block 45 are then provided to F/R distribution block 47 to calculate the total front suspension damping force and the total rear suspension damping force commands. It is generally well understood in the art that understeer behavior can be improved with a damping distribution weighted toward the rear of the vehicle and oversteer behavior can be improved with a damping distribution weighted toward the front of the vehicle. Side-to-side distribution block 49 next determined from the total front suspension damping force and the total rear suspension damping force commands the respective side-to-side distribution of damping force. In the present example, the distribution is simply 50% to each of the respective vehicle corner dampers associated with the corresponding front and rear damping force commands. The output from the side-to-side distribution block 49 comprises four corner specific suspension feedback damping commands (LF, RF, LR and RR).

The four corner specific suspension feedback damping commands are provided to damper motion resolver block 51. Additionally, damper motion resolver block 51 includes vehicle yaw rate ($\psi$) and the suspension feedforward commands from the feedforward control block 29. The damper motion resolver block 51 determines damper motion dependant damping force commands in accordance with the criticality of the damper motion to the feedback control maintaining vehicle stability in light of potentially destabilizing ride events. The four corner specific suspension feedback damping commands are therefore further resolved into jounce and rebound commands for the control of the damping forces at the respective vehicle corner dampers.

In a preferred embodiment, the suspension feedforward command will be used to command the damping force for the corners and non-critical damper motion combinations. And, the suspension feedback command will be used to command the damping force for the corners and critical damper motion combinations. The matrix of FIG. 5 illustrates the critical and non-critical corner damper and motion combinations. For example, the feedback control in a vehicle executing a right turn maneuver experiencing an oversteer event would exhibit increasing suspension damper feedback commands corresponding to the front corners and decreasing suspension damper feedback commands corresponding to the rear corners in order to arrest the oversteer event. In contrast, a vehicle executing a right turn maneuver experiencing an understeer event would exhibit increasing suspension damper feedback commands corresponding to the rear corners and decreasing suspension damper feedback commands corresponding to the front corners in order to arrest the understeer event. Since the vehicle is in a right turn, the control critical damper motion and vehicle corner combinations are, as set forth in FIG. 5, jounce for the left front and rear corners and rebound for the right front and rear corners. Similarly for the right turn, the control non-critical damper motion and vehicle corner combinations are, as set forth in FIG. 5, rebound for the left front and rear corners and jounce for the right front and rear corners. The damper command arbitration block 15 would implement the feedback commands to the control critical damper motion and vehicle corner combinations and implement the feedforward commands to the control non-critical damper motion and vehicle corner combinations. The matrix combinations of FIG. 5 may be implemented, for example, through vehicle calibration tables corresponding, for example, to vehicle turning direction and vehicle stability control flags. By the present invention, the closed loop damper control is implemented only on the vehicle corner dampers and in the direction of damper motion critical to the yaw dynamics of the vehicle thereby minimizing the effects of such control on potentially destabilizing ride events which may occur during the application of the closed loop control.

The invention has been described with respect to certain exemplary embodiments. However, it is to be understood that various modifications and alternative implementations of the invention without departing from the scope of the invention as defined in the following claims.

We claim:

1. Method for vehicle stability suspension control on a vehicle including a plurality of controllable suspension dampers comprising:
   providing vehicle stability control critical and non-critical combinations of controllable suspension damper positions, damper motion directions, and vehicle turning directions;
   controlling said vehicle stability control critical combinations using a feedback damper control signal; and,
   controlling said vehicle stability control non-critical combinations using a feedforward damper control signal.

2. The method for vehicle stability suspension control as claimed in claim 1 wherein said feedback damper control signal is determined based on a plurality of vehicle dynamics metrics.

3. The method for vehicle stability suspension control as claimed in claim 2 wherein said plurality of vehicle dynamics metrics comprises vehicle speed, vehicle lateral acceleration and steering wheel angle.

4. The method for vehicle stability suspension control as claimed in claim 1 wherein said feedforward damper control signal is determined based on a plurality of vehicle dynamics metrics.

5. The method for vehicle stability suspension control as claimed in claim 4 wherein said plurality of vehicle dynamics metrics comprises vehicle speed, vehicle lateral acceleration and steering wheel angle.

6. Control apparatus for a vehicle suspension system including controllable suspension dampers associated with each vehicle corner, comprising:
   a feedback controller effective to provide a suspension damper feedback command based on a respective plurality of vehicle dynamics metrics;
   a feedforward controller effective to provide a suspension damper feedforward command based on a respective plurality of vehicle dynamics metrics; and,
   a suspension damper command arbitrator effective to determine which of the feedback command and the feedforward command is used to control each of said controllable suspension dampers based on a respective plurality of vehicle dynamics metrics.

7. The control apparatus as claimed in claim 6 wherein the respective plurality of vehicle dynamics metrics of said feedback controller comprises vehicle yaw rate error and vehicle lateral velocity error.

8. The control apparatus as claimed in claim 6 wherein the respective plurality of vehicle dynamics metrics of said feedback controller comprises vehicle speed, vehicle lateral acceleration and steering wheel angle.

9. The control apparatus as claimed in claim 6 wherein the respective plurality of vehicle dynamics metrics of said feedforward controller comprises vehicle speed, vehicle lateral acceleration and steering wheel angle.

10. Method for suspension control on a vehicle including a plurality of controllable suspension dampers comprising:
    determining vehicle turning direction;
    determining for each controllable suspension damper a respective damper motion direction; and,
    during a vehicle stability enhancement suspension control:
    closed loop controlling controllable suspension dampers corresponding to predetermined control critical combinations of vehicle turning direction and respective controllable suspension damper motion direction; and
    open loop controlling controllable suspension dampers corresponding to predetermined control non-critical combinations of vehicle turning direction and respective controllable suspension damper motion direction.

11. The method for vehicle suspension control as claimed in claim 10 wherein said vehicle stability enhancing suspension control is implemented in response to vehicle oversteer and understeer events.

* * * * *